April 28, 1970

G. A. DOEHNER 3,509,339

APPARATUS AND METHOD FOR PRODUCING PHOTOGRAPHIC RECORDS
OF DISTRIBUTION PATTERN OF RADIOACTIVE
ISOTOPES IN HUMAN BODY

Filed Aug. 30, 1967

INVENTOR
GUNTHER ANTHONY DOEHNER
BY
*Philip S. McBean*
ATTORNEY

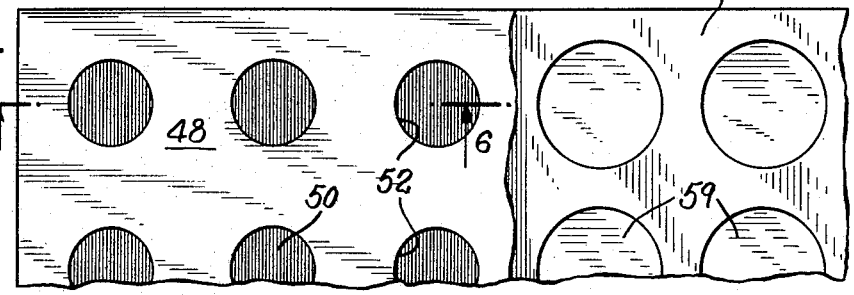
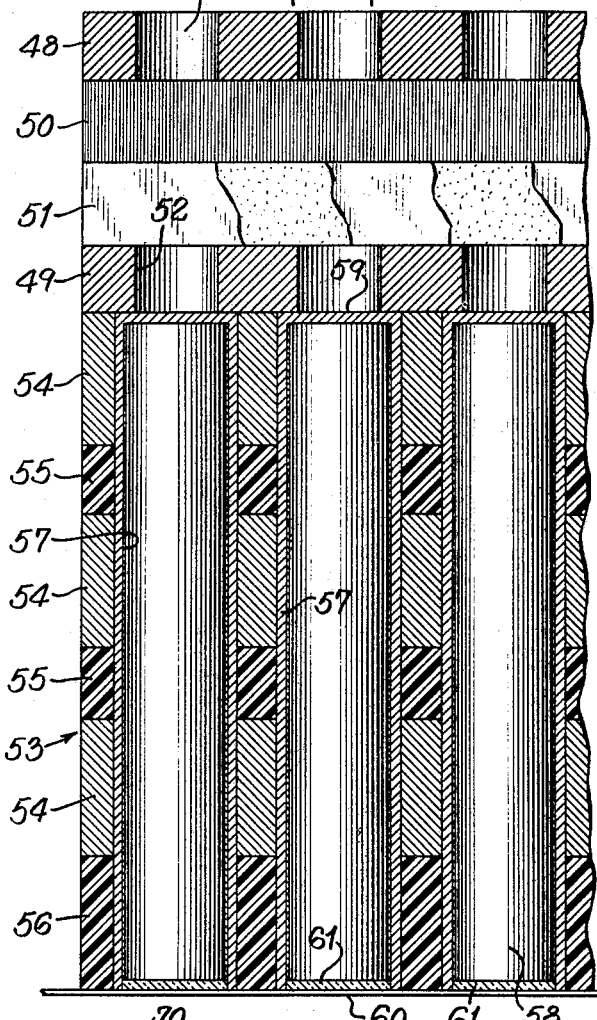
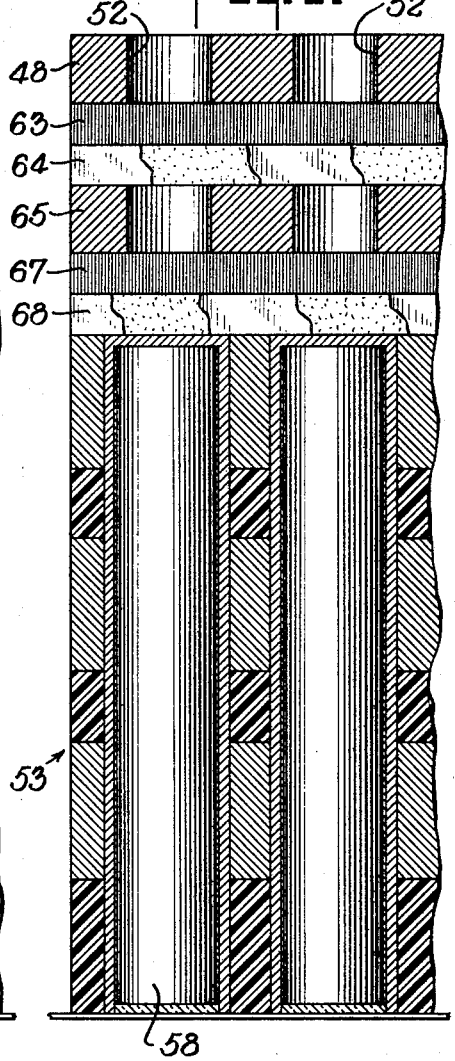
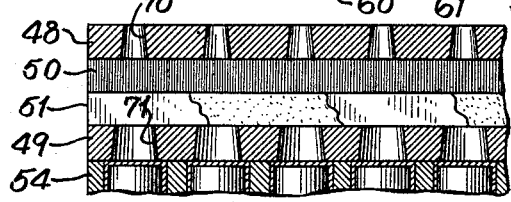
INVENTOR
GUNTHER ANTHONY DOEHNER
BY
ATTORNEY April 28, 1970

G. A. DOEHNER 3,509,339

APPARATUS AND METHOD FOR PRODUCING PHOTOGRAPHIC RECORDS
OF DISTRIBUTION PATTERN OF RADIOACTIVE
ISOTOPES IN HUMAN BODY

Filed Aug. 30, 1967

INVENTOR
GUNTHER ANTHONY DOEHNER
BY
ATTORNEY

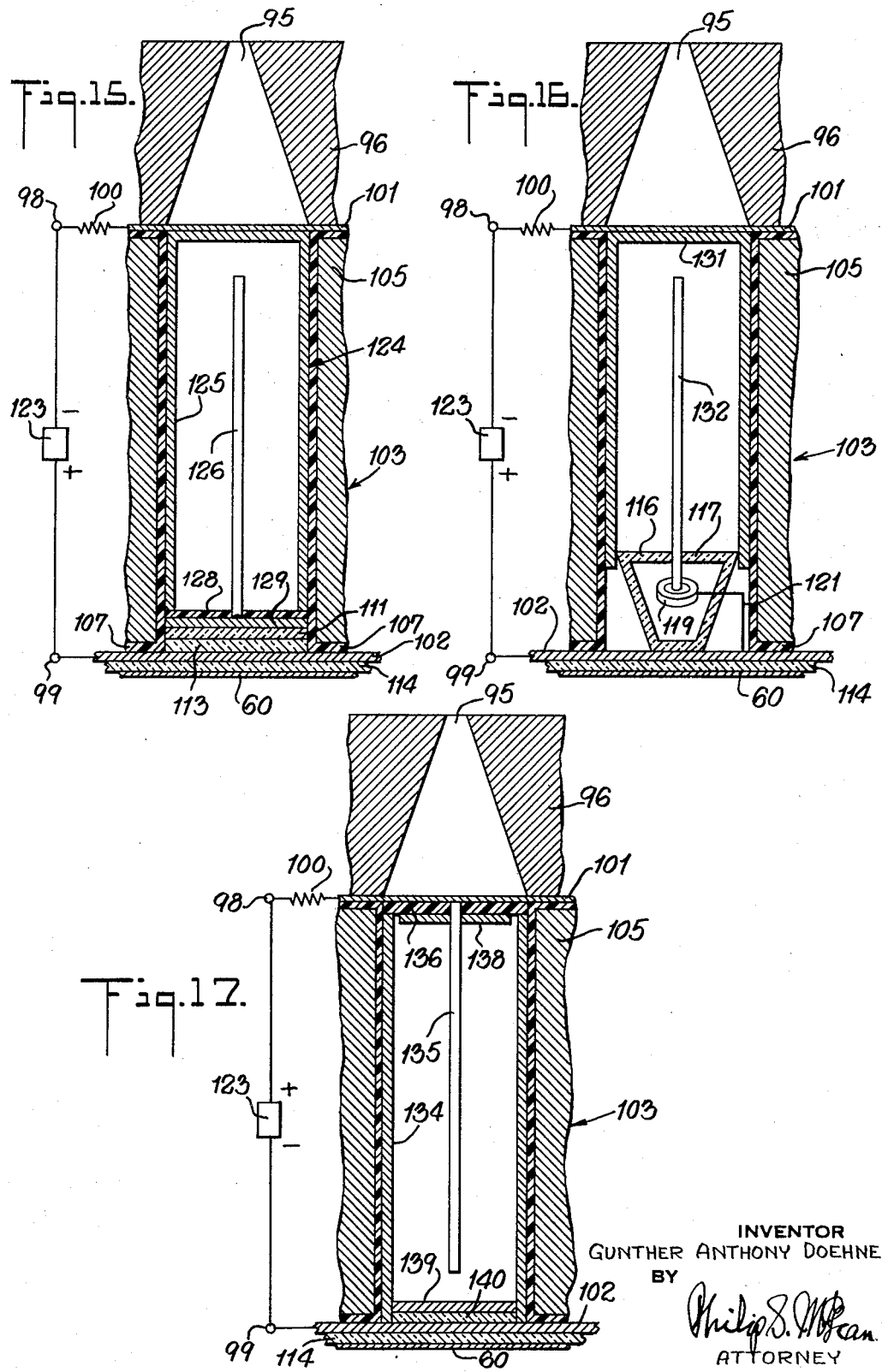

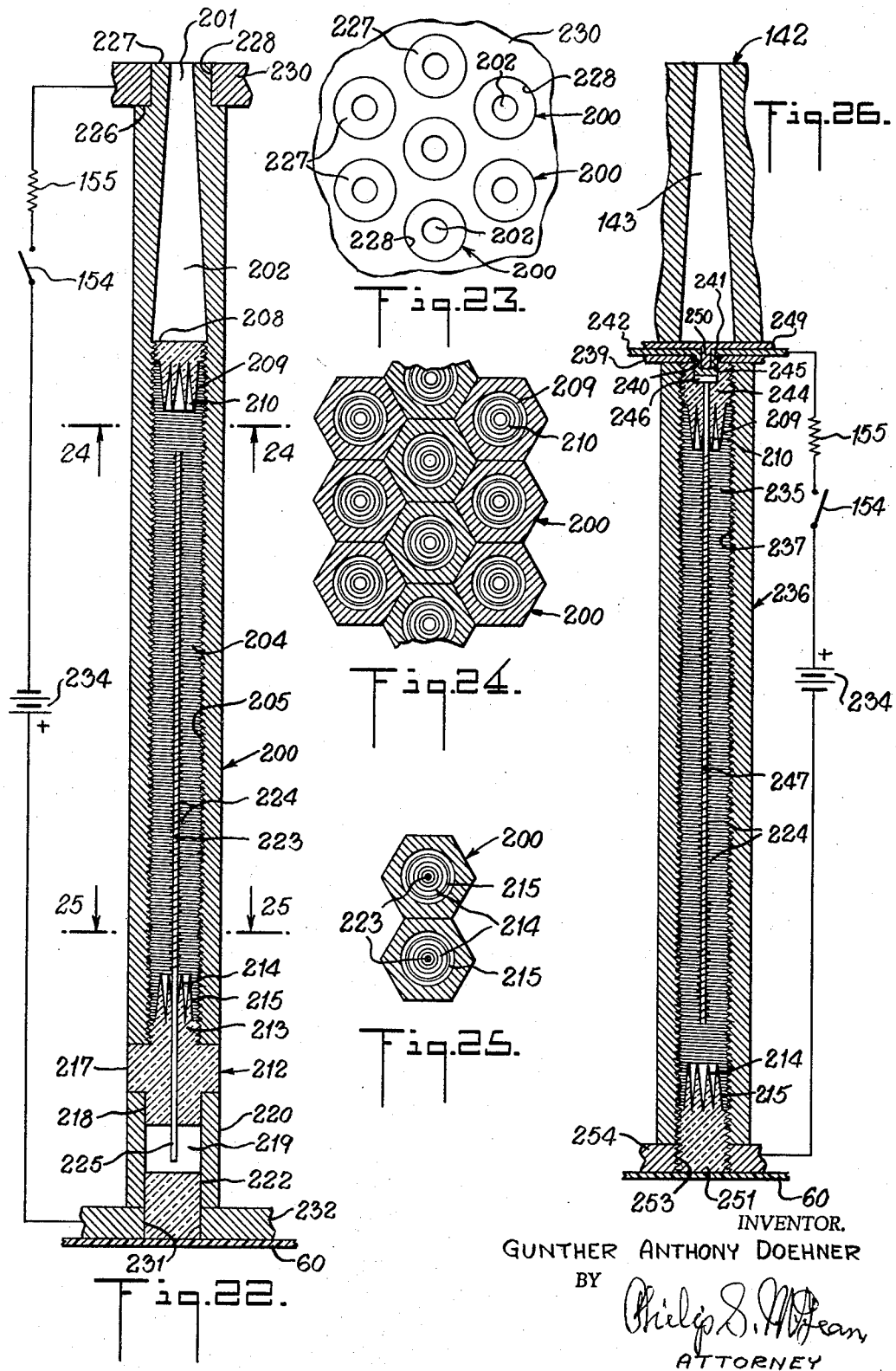

April 28, 1970   G. A. DOEHNER   3,509,339
APPARATUS AND METHOD FOR PRODUCING PHOTOGRAPHIC RECORDS
OF DISTRIBUTION PATTERN OF RADIOACTIVE
ISOTOPES IN HUMAN BODY
Filed Aug. 30, 1967   8 Sheets-Sheet 8

INVENTOR.
GUNTHER ANTHONY DOEHNER
BY
ATTORNEY

United States Patent Office 3,509,339
Patented Apr. 28, 1970

1

3,509,339
APPARATUS AND METHOD FOR PRODUCING
PHOTOGRAPHIC RECORDS OF DISTRIBUTION
PATTERN OF RADIOACTIVE ISOTOPES IN
THE HUMAN BODY
Gunther Anthony Doehner, 8 Tyson Lane,
Rumson, N.J. 07760
Continuation-in-part of application Ser. No. 567,994,
July 26, 1966. This application Aug. 30, 1967, Ser.
No. 666,544
Int. Cl. G01n 21/34, 23/04
U.S. Cl. 250—65                                29 Claims

ABSTRACT OF THE DISCLOSURE

A collimating and light-producing device which forms a photographic image of the the distribution pattern of radiations emanating from a source such as a portion of the human body containing radioactive isotopes. Various forms of collimators are illustrated. Each of the collimators excludes radiations having a path of travel which deviates materially from normal to the plane of the photographic film or plate. The radiations which have passed through the collimator produce illumination and exposure of a photographic film in accordance with the radiation intensity of each of many discrete areas determined by the collimator. Light producing devices include crystals such as thallium-activated sodium iodide, caesium iodide, plastic phosphors, semi-conductors such as cadmium sulfide connected to control current flow through an electrofluorescent phosphor, neon glow lamps through which current flow is controlled by a semi-conductor or an ionization chamber, and ionization chambers used directly.

The light exposes the film with a pattern which represents the pattern of radiation distribution in the portion of the body under examination. Any abnormality in the distribution pattern indicates a corresponding abnormality in the body and diagnosis becomes possible in situations where X-ray examination would reveal nothing.

This application is a continuation-in-part of my co-pending application, Ser. No. 567,994 filed July 26, 1966 and now abandoned.

The present invention relates to photographic apparatus for producing a record of the distribution pattern of radioactive isotopes in the human body.

The apparatus comprises a collimator member which restricts the passage of radiations to those emanating from points which lie within a maximum predetermined angle from the normal, so that radiations passing through the collimator member are substantially parallel.

Directly behind the collimator member is a radiation responsive member. The radiation responsive member comprises an array of radiation responsive light emitting elements each of which is located for activation by radiations passing through a small predetermined area of the collimator member. The photographic recording medium is located immediately behind the radiation responsive member.

2

The invention will be described in greater detail in the following specification with reference to the accompanying drawing forming a part hereof.

In the drawing:

FIGURE 5 is a fragmentary front view of an embodiment similar to that shown in FIG. 1, the front protective cover being omitted and the view being partly broken away to illustrate the front ends of the light-emitting elements.

FIGURE 6 is a side view in sectional elevation taken along the line 6—6 of FIG. 5.

FIGURE 7 is a sectional view similar to FIG. 6 showing a modified form of construction.

FIGURE 8 is a view similar to FIG. 6, but on a reduced scale, showing a modification using a collimator grid with frusto-conical apertures.

FIGURE 13 is a fragmentary view in axial section showing a single cell using a semi-conductor type of light control element in association with an electrofluorescent light-emitting element.

FIGURE 14 is a view similar to FIG. 13 showing a semi-conductor type of light control element in association with a gas-discharge or cathode glow type of light-emitting element.

FIGURE 15 is a view similar to FIG. 13 showing an ionization chamber type of light control element in association with an electrofluorescent light-emitting element.

FIGURE 16 is a view similar to FIG. 15 showing an ionization chamber type of light control element in association with a gas-discharge or cathode glow type of light-emiting element.

FIGURE 17 is a view similar to FIG. 15 showing an ionization chamber type of light control element using the gas-discharge illumination either directly or in association with an optional electrofluorescent layer for light emission.

FIGURE 22 is a view in sectional side elevation showing a combined collimator, ionization chamber and gas-discharge illumination element, a single element being separately illustrated.

FIGURE 23 is a fragmentary plan view showing the front ends of a plurality of combined elements according to FIG. 22 arranged in a group.

FIGURE 24 is a fragmentary transverse sectional view taken along the line 24—24 of FIG. 22 looking forwardly in the direction of the arrows and illustrating a plurality of elements according to FIG. 22 arranged in a group as in FIG. 23.

FIGURE 25 is a transverse sectional view taken along the line 25—25 of FIG. 22 looking rearwardly and showing two combined elements placed side by side.

FIGURE 26 is a sectional view in elevation illustrating a combined ionization and illumination producing element of hexagonal cross-section as in the case of FIG. 22, but with a collimator structure which is separate from the combined elements.

Figure 1:
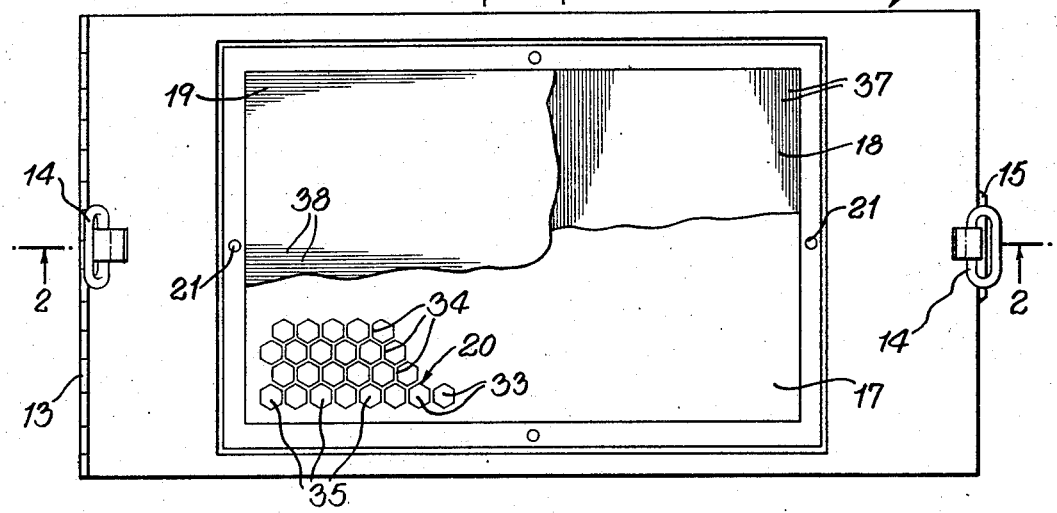
FIGURE 1 is a front view of an embodiment of the invention, the view being partly broken away and shown in section to illustrate details of construction.
Figure 2:
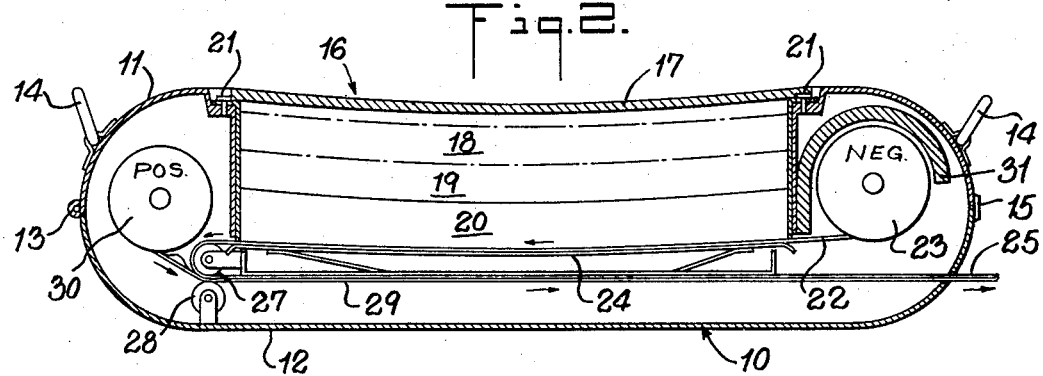
FIGURE 2 is a view in longitudinal section of the embodiment shown in FIG. 1, the view being taken on the line 2—2 of FIG. 1.

Referring to FIGS. 1 and 2, the device illustrated comprises a light-proof enclosure designated generally as 10. The enclosure 10 includes a front portion 11 connected to a rear portion 12 by a hinge 13. The front portion is provided with loops 14 to receive straps (not shown) for positioning the device on a patient during use. A releasable catch 15 permits the enclosure 10 to be opened at will.

The front portion 11 is centrally apertured to receive a unit designated generally as 16 comprising a radiation permeable protective cover sheet 17 formed of material such as aluminum, two collimator grids 18 and 19, and a light emitting grid 20, the grids being described in greater detail below. The unit 16 is secured in the front portion 11 of enclosure 10 by rivets 21.

A photographic recording medium 22 such as a negative film or coated paper is delivered from a supply spool 23 over a pressure plate 24 which presses its light-sensitive surface against the rear light emitting surfaces of the light-emitting elements of grid 20. As known in the photographic art, the photographic recording medium 22 is a negative coated paper of the self-developing type and includes a pulling strip 25 and a rupturable capsule 26 (not shown) containing the developing agent. After the exposure is completed, the exposed surface is pulled through the nip of rollers 27 and 28 along with positive printing paper 29 from a supply spool 30. This ruptures the capsule and distributes the developing agent between the exposed surface of the negative strip 22 and the coated surface of the positive strip 29. Other forms of photosensitive medium, of course, be utilized in accordance with the particular set of operating conditions. The supply of negative strip on spool 23 is protected against premature radiation exposure by a radiation opaque shield 31.

The light-emitting grid 20 comprises a group of hexagonal cells 33 defined by thin walls 34 of relatively radiation-opaque material such as lead or tungsten. Each of the cells 33 contains a hexagonal light-emitting crystal 35 formed of material such as thallium-activated sodium iodide, caesium iodide, or a suitable plastic phosphor. The amount of light emitted is generally proportional to the intensity of the radiation penetrating within the crystal or plastic phosphor. This light exposes that portion of the photosensitive recording medium which is directly behind the particular cell.

The front collimator grid 19 consists of a group of spaced parallel lead or similar strips 37 separated by a suitable radiation transparent material. The rear collimator grid 20 consists of a similar set of strips 38 which are perpendicular to the strips 37. The radiation reaching each crystal is thus limited to radiation arriving generally from directly in front of the individual crystal. In this manner a distribution pattern of the radiation is produced upon the photographic recording medium.

Figure 3:
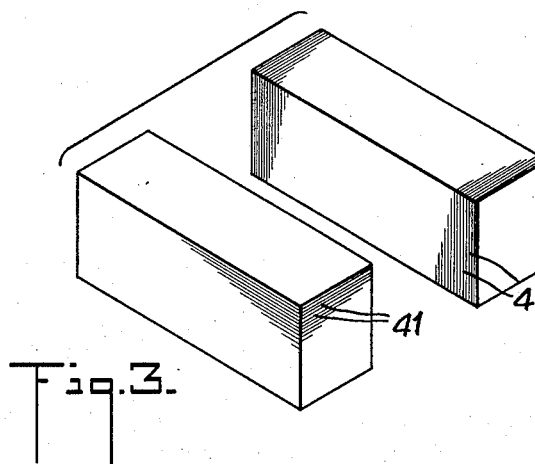
FIGURE 3 is a perspective view of a fine mesh collimator formed of two groups of closely spaced mutually perpendicular strips, the two groups of strips being shown separated for clarity of illustration.

As exemplified in FIG. 3, a collimator of the type described above is shown consisting of a group of horizontal strips 41 and a group of vertical strips 42, the two groups being shown spaced apart for clarity of illustration.

Figure 4:
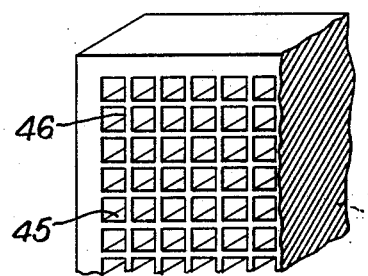
FIGURE 4 is a fragmentary perspective view of a grid structure having cells of square cross-section.

In FIG. 4, the light-emitting grid is shown comprising cells 45 of square transverse cross-sectional configuration defined by walls 46 of radiation opaque material. The crystals have been omitted.

Referring to FIGS. 5 and 6, the apparatus comprises a front collimating member 48 and a rear collimating member 49. The members 48 and 49 are separated by intermediate collimating members 50 and 51 formed of mutually perpendicular strips as described above. The front and rear collimating members 48 and 49 are formed of radiation opaque material and have axially aligned cylindrical apertures 52 formed therein.

The light-emitting member, designated generally as 53, comprises a series of radiation opaque members 54 separated by intervening members 55. A rear member 56 is also provided. Members 55 and 56 are formed of plastic material in order to reduce the cost and overall weight of the apparatus. The light-emitting member 53 has cylindrical chambers 57 formed therein each of which is axially aligned with two of the apertures 52 in collimating members 48 and 49.

Disposed in each of the chambers 57 is a cylindrical light emitting crystal 58 enclosed in a cylindrical container 59 formed of radiation transparent material such as aluminum. The container 57 is closed at its front end and open at its rear end. The rear end is closed against the ingress of moisture by a glass disc 61 in contact with a photographic recording medium 60.

Referring to FIG. 7, the front collimating member is arranged as shown in FIGS. 5 and 6. A front pair of intermediate grid type collimating members 63, 64 is arranged immediately behind the front collimating member 48. A further collimating member 65, similar to the front collimating member 48 is disposed immediately behind the mutually perpendicular strip collimating members 63, 64. A further pair of mutually perpendicular strip type collimating members 67, 68 is interposed between the further collimator member 65 and the light-emitting member 53. This modification provides for mutually perpendicular strip collimation in two successive stages each of which is about one-half of the thickness of the single stage arangement 50, 51 of FIG. 5 and 6.

The arrangement shown in FIG. 8 is similar to that described above in connection with FIGS. 5 and 6. The front collimating member 48, instead of being provided with cylindrical apertures 52, has forwardly convergent frusto-conical apertures 70 formed therein. Similarly, the rear collimator member 59 has forwardly convergent frusto-conical apertures 71 formed therein. The apertures 70 and 71 are axially aligned and have the same apex angle or angle of convergence. Additionally, the apertures 70 and 71 converge toward a common apex.

Figure 9:
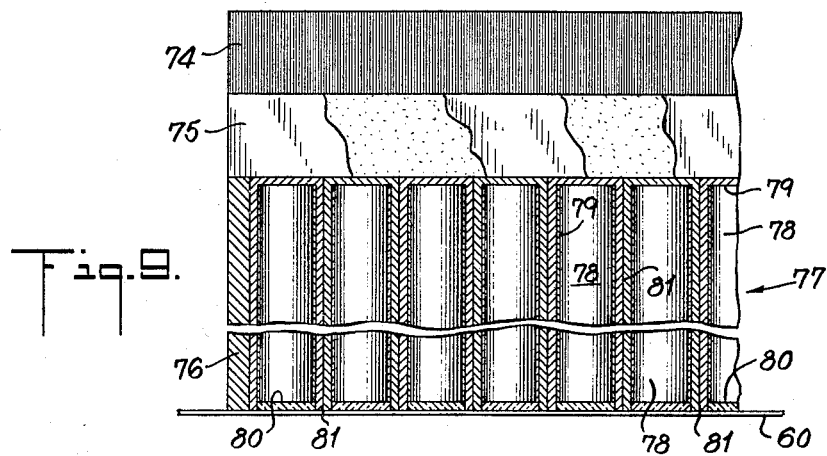
FIGURE 9 is a sectional view similar to FIG. 6 in which the collimator member consists entirely of mutually perpendicular laminations.

Referring to FIG. 9, the apparatus comprises front and rear mutually perpendicular strip type collimator members 74 and 75, respectively. The collimator members 74 and 75 are supported by lateral walls 76 of a light-emitting unit 77. The light-emitting unit 77 comprises crystals 78 enclosed in light-opaque containers 79 the rear ends of which are closed against the entry of moisture by glass or other translucent moisture impermeable windows 80. The containers 79 are placed in side by side relationship with thin radiation opaque separation 81 therebetween for operation at medium energy levels, in the range of from 150,000 to 250,000 electron volts. The transverse cross-sectional configuration of the crystals 78 is preferably triangular, square or hexagonal which will permit their arrangement without appreciable vacant cross-sectional area in the assembly of crystals. Cylindrical crystals may be used, if desired.

Figure 10:
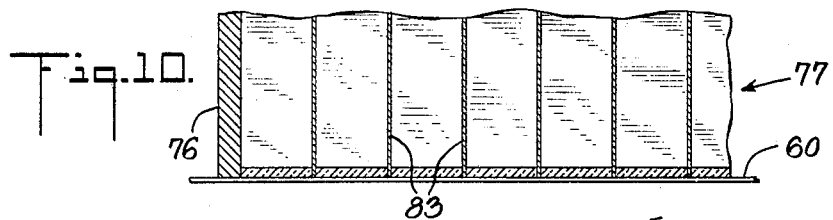
FIGURE 10 is a fragmentary sectional view in side elevation showing a thin-walled grid defining cells of square transverse cross-sectional configuration.
Figure 11:
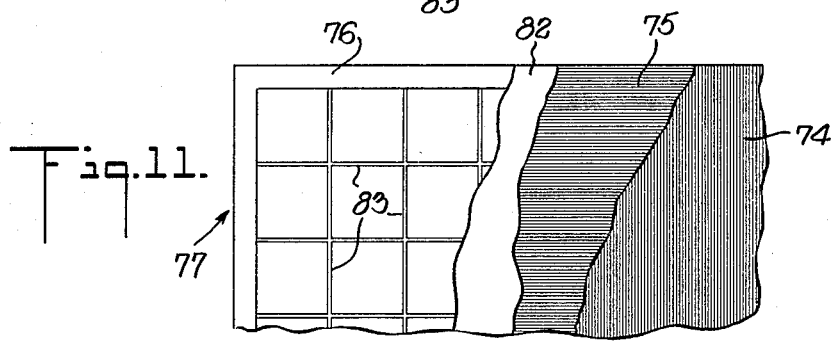
FIGURE 11 is a front view of a device wherein the collimator member consists entirely of mutually perpendicular laminations, the view being partly broken away to illustrate a rearwardly located thin-walled grid as shown in FIG. 10.

FIGURES 10 and 11 illustrate an arrangement similar to FIG. 9, described above, wherein the crystals (not shown) are of square cross-sectional configuration. Immediately behind the front and rear collimator members 74 and 75 is a light-opaque radiation-transparent sheet 82. Within the lateral walls 76, the light-emitting unit 77 is divided into a series of compartments of square transverse cross-sectional configuration by partition walls 83 to receive crystals of complementary shape (not shown). The walls 83 are formed of light-opaque material which is preferably, but not necessarily, radiation-opaque. The arrangement of FIGS. 10 and 11 is for operation at low energy levels in the range from 30,000 to 150,000 electron volts.

Figure 12:
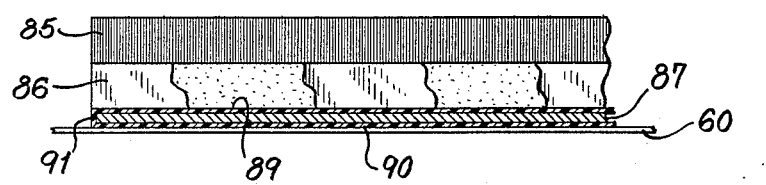
FIGURE 12 is a fragmentary sectional view in side elevation showing a low energy type apparatus using a collimator grid formed of thin mutually perpendicular strips.

FIGURE 12 illustrates a modified form of apparatus for operation at low energy levels of less than about 75,000 electron volts. The device comprises front and rear collimator members 85 and 86, respectively, of the mutually perpendicular strip type. The single crystal 87 is in the form of a continuous plate. The front of the crystal 87 is covered by a light-opaque radiation-transparent sheet or coating 89 located immediately behind the rear collimator member 86. The rear of the crystal 87 is covered by a translucent or transparent sheet or coating 90 in contact with the photographic recording medium 60. Moisture is excluded by a peripherally extending member or seal 91 interconnecting the edges of the sheets 89 and 90.

FIGURE 13 illustrates a modification wherein the electrical resistance of a semi-conductor 94 of cylindrical shape is reduced by radiation arriving through a frusto-conical aperture 95 formed in a collimator member 96. A material suitable for semi-conductor 94 is cadmium sulfide.

An energizing potential supplied from an alternating current source 97 is applied to energizing terminals 98 and 99. A current-limiting resistor 100 may be provided, if desired. Terminal 98 is connected to a front electrode 101 which is formed of light-opaque radiation permeable material such as aluminum or copper. Copper is preferred for higher energy levels. Terminal 99 is connected to a rear electrode 102 formed of translucent electrically conductive material such as stannous oxide. The source 97 supplies an alternating voltage of the order of about 100 to 1000 volts at a frequency of the order of 25 to 5000 cycles per second.

The light-emitting portion of the device, designated generally as 103, lies between the electrodes 101 and 102 and comprises a radiation-opaque grid 105 defining a suitable number of individual cells 106 to provide the desired image resolution. The grid 105 is covered by electrically insulative material 107 in sheet form or applied as a coating to provide suitable insulation between the electrodes 101 and 102.

The front end of the semi-conductor 94 is covered by a flanged cap 109 formed of aluminum or copper and which is energized by the front electrode 101. The rear end of the semi-conductor 94 is covered by a flanged cap 110 likewise formed of aluminum or copper. The outer surface of the rear cap 110 is covered with a ceramic dielectric coating 111 which forms the dielectric of a quasi-capacitor. The dielectric 111 is covered at its rear by a coating 113 of an electrofluorescent phosphor which becomes luminous in response to the flow of alternating current therethrough. The rear cap 110 and the luminescent coating 113 operate as the electrodes of a capacitor separated by the dielectric layer 111. The luminescent coating 113 is energized by the rear electrode 102.

An electrically insulative layer 114 is interposed between the rear electrode 102 and the photographic recording medium 60. The layer 114 may be formed of glass or it may be a translucent ceramic coating. In certain instances, it may be desirable to provide light attenuation in the electrically insulative layer or coating 114 in order to increase the exposure time and thereby obtain a more correctly representative average exposure in the various areas and in the distribution pattern appearing on photographic medium 60.

FIGURE 14 shows a modification wherein the luminescent coating 113 of FIG. 13 has been replaced by a lamp 116 of the cathode glow gas discharge type. The lamp 116 comprises a glass envelope 117 filled with a suitable zero valence or noble gas such as neon, argon or the like. A central rod-shaped electrode 118 is encircled by an annular electrode 119.

The rod-shaped electrode 118 extends upwardly through the glass envelope 117 and its upper end engages the rear cap 110 of the semi-conductor 94. The annular electrode 119 is supported by a conductor 121 which extends through the envelope 117 and is connected to the rear electrode 102 of the light emitting portion 103 of the device for energization by the alternating current source 97. Radiation penetrating the semi-conductor 94 reduces its electrical resistance, as described above. The reduced resistance permits current flow through the lamp 116 sufficient to cause gaseous discharge and the emission of light. The light passes through layers 102 and 114, as previously described, and exposes the photographic medium 60.

In FIG. 15, there is shown a radiation detector of the ionization chamber type which is similar to the ionization chamber of a Geiger counter. The alternating current source 97 has been replaced by a unidirectional source 123 the output of which is pulsating or sustained as determined by the operational requirements of the ionization chamber. The detector, which is designated generally as 124, comprises a tubular shell 125 which is closed at its forward end. The shell 125 is formed of metal such as copper or aluminum and constitutes the cathode of detector 124. Extending axially within the ionization chamber partially defined by the shell 125, is a metallic rod 126 which constitutes the anode of the detector 124. The rod 126, at its rear end, extends through a disc 128 of electrically insulative material which serves to insulate the ionization chamber electrodes 125 and 126 from each other.

Confined within the shell 125 is a noble gas such as neon or argon at a total pressure of the order of 50 to 100 millimeters of mercury absolute. A quenching agent such as ethanol or iodine in vapor form is mixed with the noble gas, the quenching agent contributing a partial pressure of the order of 1 to 10 millimeters of mercury to the total pressure of 50 to 100 millimeters.

An external electrode disc 129 is connected to the rear end of the rod electrode 126. A ceramic coating 111, electrofluorescent layer 113, translucent conductive layer 102, translucent electrical separator 114, and photographic medium 60 are provided as described above in connection with FIG. 13.

FIGURE 16 utilizes the ionization chamber detector of FIG. 15 in conjunction with the cathode glow lamp of FIG. 14. The front portion of the ionization chamber is defined by a tube 131 formed of copper or aluminum and closed at its front end. The rear portion of the tube 131 is closed by the cathode glow lamp 116. The central electrode 132 extends through the glass envelope 117 of lamp 116 so that it serves simultaneously as the anode of the ionization chamber and as the cathode of the glow lamp 116. The rear portion comprising the glow lamp 116 is arranged as described above in connection with FIG. 14.

FIGURE 17, like FIGS. 15 and 16, utilizes an ionization chamber. In FIG. 17, the ionization chamber comprises a cylindrical electrode 134 and a rod-shaped central electrode 135. The cylindrical electrode 134 directly engages the electrically conductive translucent layer 102 which is the rear energizing electrode for the light-emitting unit 103. The central electrode 134 is extended forwardly through a disk 136 formed of electrically insulative material for energization by the front electrode 101 of the light-emitting unit 103.

Optionally, the disk 138 of radiation opaque material may be located directly behind the insulating disk 136 for increasing the electron emission within the chamber laterally defined by the cylindrical electrode 134. The disk 138 is of smaller diameter than the internal diameter of the cylindrical electrode 135 in order to provide clearance avoiding electrical contact therebetween. The chamber may also optionally include a light-emitting member 139 such as a layer or coating of an electrofluorescent phosphor. The rear of the ionization chamber is closed by a glass window 140 directly in front of the electrically conductive transparent rear electrode 102. A glass or translucent electrically insulative layer 114 is interposed between the rear electrode 102 and the photographic recording medium 60, as previously described. The ionization chamber is filled with a noble gas and a quenching agent as described above for FIG. 15.

In operation, without the electrofluorescent member 139, the light accompanying ionization of the gas within the ionization chamber passes directly to the photographic recording medium 60 through window 140 and translucent layers 102 and 114. If present, the electrofluorescent member 139 is excited by current flow through the ionized gas and the resulting fluorescent illumination is utilized for exposure of the photographic recording medium 60.

Figure 18:
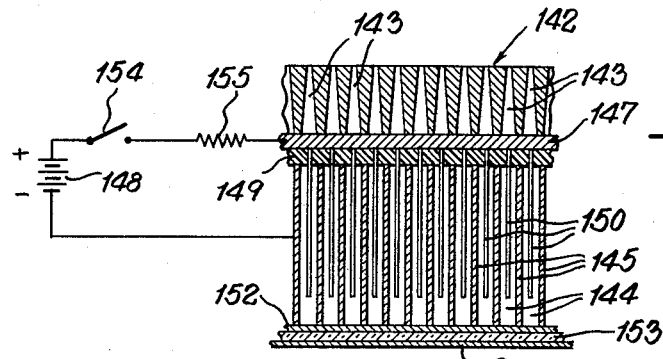
FIGURE 18 is a fragmentary view in sectional elevation illustrating a device comprising a plurality of rod-like electrodes connected to a common support.

FIGURE 18 shows an arrangement providing an array of individual ionization chambers within a common grid structure. The device comprises a front collimating member 142 having a series of frusto-conical rearwardly divergent apertures 143 formed therein, an individual aperture being associated and positioned directly in front of an individual ionization cell 144. The individual cells 144 are laterally defined by a radiation opaque grid structure 145.

Directly behind the collimating member 142, there is positioned an electrically conductive radiation permeable plate 147 which excludes visible light from the ionization cells. Plate 147 may be formed of aluminum or copper, for example. The plate 147 is connected to the positive terminal of a direct current source 148 illustratively shown as a battery. The negative terminal of source 148 is connected to the grid structure 145.

A sheet of radiation permeable electrically insulative material 149 is interposed between the collimator member 142 and the grid structure 145. A series of rod-shaped anodes 150 is secured to the plate 147. Each anode 150 extends axially into one of the individual ionization cells or chambers 144 the walls of which operate as a cooperating ionization cathode.

Optionally, at the rear of the grid structure 144, a layer 152 of electrofluorescent material is positioned between a transparent plate 153 and the rear surface of the grid structure 145. The photographic recording medium 60 is positioned directly behind the transparent plate 153. The plate 153 is formed of glass, plastic or other suitable material. If present, the electrofluorescent layer 152 is locally excited by current flow within each individual cell 144. This causes exposure of the film to an extent determined, in each instance, by the intensity of excitation of the electrofluorescent material at the rear of each cell 144. If the electrofluorescent material 152 is omitted, the light accompanying the ionization discharge between the electrodes 145 and 150 is utilized for exposure of the photographic medium 60. A switch 154 and a current limiting resistor 155 are shown serially included in the energizing circuit between the source 148 and the electrically conductive plate 147.

The construction is such that a very low subatmospheric pressure may be maintained in the cells 144 without appreciable leakage. The cells are filled with a noble gas such as neon or argon at a pressure of the order of 50 to 100 millimeters of mercury absolute. As described above in connection with FIG. 15, a quenching agent is mixed with the noble gas.

Figure 19:
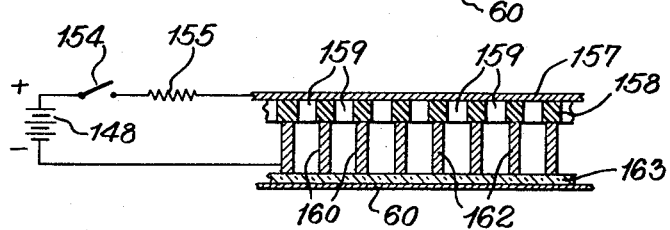
FIGURE 19 is a fragmentary view in sectional elevation of a further modification wherein the front collimating member is omitted.

A modification of FIG. 18 is illustrated in FIG. 19. In FIG. 19, the collimating member is not shown. Any of the collimating arrangements described above may be used. A front plate 157 formed of copper is disposed in front of an apertured plate 158 formed of electrically insulative material. Each aperture 159 in plate 158 is located in front of an individual cell 160 laterally defined by a radiation opaque grid member 162. Except in case of the mutually perpendicular strip type of collimator, the collimator apertures will each be aligned with an individual cell 160. The positive terminal of the source 148 is connected to the front plate 157 through a switch 154 and current limiting resistor 155, the negative terminal being connected to the grid member 162. A layer or sheet 163 of translucent or transparent insulating material closes the rear of the grid structure 162. The photographic recording medium 60 is located directly behind the transparent sheet 163 and is exposed by the light accompanying ionization within each cell 160. The arrangement of FIG. 19 is for use with low intensity radiation as compared with that of FIG. 18.

Figure 20:
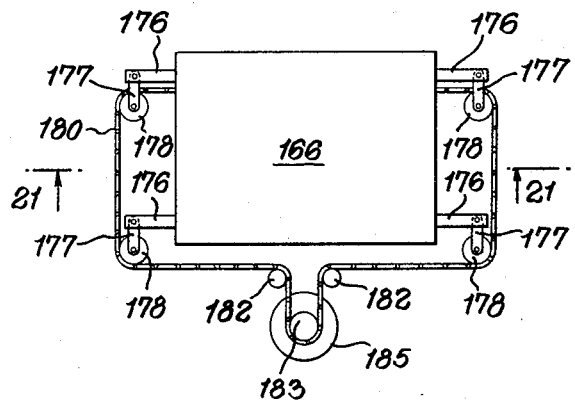
FIGURE 20 is a diagrammatic front view of the apparatus wherein the collimating and light-emitting portions are arranged to move in unison in a circular path.
Figure 21:
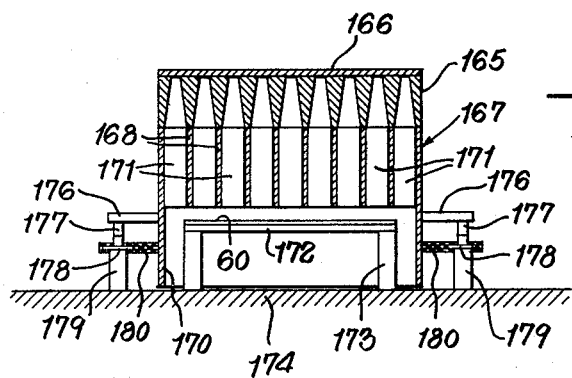
FIGURE 21 is a sectional view in side elevation taken on the line 21—21 of FIG. 20.

Referring to FIGS. 20 and 21, a collimating member 165 is covered by a light excluding radiation permeable member 166 such as a sheet of aluminum or copper. The collimating member 165, although illustratively shown as having frusto-conical apertures, may take any of the forms hereinabove described. Similarly, the light excluding member 166 may be located behind the collimating member 165 as shown in FIGS. 13–17 or may be constituted by the front end of a container such as 59 in FIGS. 5 and 6.

Disposed behind the collimating member 165 is a light emitting member designated generally as 167 comprising grid structure 168 mounted in a supporting frame 170 common to the collimator member 165 and the grid structure 168. The grid structure 168 is provided with light emitting elements 171 which may take any of the forms previously described. The photographic recording medium 60 is carried by a fixed supporting member 172 connected to the upper ends of upright posts 173 fixed to a base 174.

Four horizontal supporting arms 176 extend outwardly from the common frame 170. Each of the four arms 176 is journaled on the outer free end portion of a rotary crank arm 177. Each crank arm 177 is carried by a sprocket wheel 178 journaled in an upright support 179 mounted on the base 174. An endless drive chain 180 passes around all four of the sprocket wheels 178, two idler wheels 182 and a drive sprocket 183. The drive sprocket 183 is driven by a motor 185.

The four crank arms 177 are arranged for simultaneous orientation in the same direction and are constrained to maintain this angular relationship by the drive chain 180. Operation of the motor 185 causes the crank arms 177 to displace the collimating member 165 and light emitting elements 171 in unison in a generally circular path with the recording medium 60 maintained stationary by the fixed supporting member 172. The walls of the supporting frame 170 are extended downwardly into close proximity to the base 174 for excluding light from the recording medium 60 during operation of the motor 185. The radius of the crank arms 177 is such as to eliminate the shadow of the grid structure 168 and its magnitude will be determined, at least in part, by the wall thickness of the grid structure. In any event, it will not ordinarily exceed the maximum center-to-center spacing between adjacent light emitting elements 171.

Referring to FIGS. 22–25, a combined collimator, ionization chamber and illumination element is illustrated, the individual element being designated generally as 200. The element 200 is of hexagonal cross-sectional configuration having an axial bore 201. The element 200 is formed of lead, tungsten or other suitable radiation-opaque material.

The upper or front end portion of element 200 which faces the source of radiations, defines a frusto-conical collimator chamber 202. The central portion defines a generally cylindrical ionization chamber 204 having an internal helical thread 205 formed on its lateral wall. The thread 205 increases the effective electron emission area of the lateral wall of chamber 204. The height of the thread 205 is preferably about 0.25 millimeter. The thread 205 is of V-shaped cross-sectional configuration and the sharp edges of the V-shape further enhance electron emission from the lateral wall of the ionization chamber 204.

The upper end of the ionization chamber 204 is closed by an externally threaded plug member 208 formed of light-opaque radiation-transparent material such as a ceramic or dark glass, aluminum, copper or lead depending on the energy of the radiation used. The threaded engagement between the plug member 208 and the thread 205 is such as to provide a gas-tight seal and may include a suitable sealant to prevent leakage.

The inner end of plug member 208 has integrally formed concentric annular walls 209 and 210 which extend downwardly. The walls 209 and 210 are of sharp-edged V-shaped cross-sectional configuration and, to the extent that the plug member 208 is slightly electrically conductive, electron emission is enhanced.

The lower end of the ionization chamber 204 is closed by an anode supporting member designated generally as 212. The anode supporting member 212 is formed of electrically insulative material and comprises an upper exteriorly threaded portion 213 which engages the internal thread 205 to form a gas-tight seal as in the case of the plug member 208. The upper portion 213 is provided with integrally formed concentric annular walls 214 and 215 similar to the walls 209 and 210 described above.

The central portion of the anode supporting member 212 is hexagonal and its flat outer surfaces are smoothly aligned with the other external surfaces of the hexagonal element 200. The lower portion of the anode supporting member 212 extends into a neon light or cathode glow lamp chamber 219 defined by a rear end member 220. The rear end of the neon light chamber 219 is closed by a transparent or at least translucent cylindrical plug member 222. The external shape of the lower end member 220 is hexagonal and its flat outer surfaces are smoothly aligned with the other external surfaces of the hexagonal element 200.

An elongated needle-like anode 223 extends axially within the ionization chamber 204 and is fixedly mounted in the anode supporting member 212. The ionization chamber 204 is filled with a noble gas as described above for the ionization chamber partially defined by the shell 125 of FIG. 15. A thin electrically conductive wire 224 is helically wrapped around the anode 223 within the ionization chamber 204. Alternatively, the anode 223 may be threaded and the wire 224 omitted. The anode 223 is formed of steel or other suitable electrically conductive material and the wire 224 may be secured to the anode 223 as by spot welding or a tight resilient fit between the helically coiled wire 224 and the anode 223. The wire 224 serves to increase the effective surface area of the anode 223 and thereby enhance electron emission.

The lower end 225 of the anode 223 extends into the neon light chamber 219 where it operates as the cathode of a glow lamp with the internal wall surface of the electrically conductive rear end member 220 serving as an anode. The chamber 219 is filled with a suitable gas such as neon or argon under adequate pressure to operate as a conventional glow lamp.

The front portion of each element 200 is shouldered at 226 to form a cylindrical end portion 227 of reduced diameter with respect to hexagonal flat surfaces. The front end portions 227 of a plurality of elements 200 are fitted into complementary circular apertures 228 formed in a metallic front end plate 230.

At the rear end of each element 200, the plug member 222 extends rearwardly beyond the rear end of member 220 into a complementary recess 231 formed in an electrically conductive rear plate 232. The rear face of the plug member 222 is flush with the rear surface of the plate 232. The photographic film 60 extends over the rear surface of the plate 232 for exposure to light generated in the lamp chamber 219 on the cathode portion 225 of the anode 223 and passing through the transparent plug member 222.

A source of unidirectional electrical potential is illustratively shown as a battery 234. The output of the source 234 is preferably in the range from 300 to 500 volts D.C. The magnitude of the voltage is adjusted to provide the minimum value required to obtain a complete ionization discharge in the chamber 204. A switch 154 and current limiting resistor 155 are also provided as shown in FIGS. 18 and 19. The switch 154 permits the ionization to be terminated at will and the resistor 155 limits the maximum current flow to a predetermined safe value.

Refrring to FIG. 26, a front collimating member 142 is provided as described above for FIG. 18. A generally cylindrical ionization chamber 235 is defined by an elongated member designated generally as 236 of external hexagonal cross-sectional configuration like the element 200 shown in FIGS. 24 and 25. The ionization chamber defining member 236 has a helical thread 205 formed on its internal lateral wall like the thread 205 of ionization chamber 204.

A sheet of electrically insulative material 239 extends across the tops of the hexagonal members 236. The sheet 239 has circular apertures or perforations 240 formed therein for receiving cup-shaped indentations or cylindrical plugs 241 formed in or inserted into a sheet 242 of electrically conductive and radiation absorbing material. The front plug member 244 has a cylindrical recess which receives a flat circular head portion 246 of an anode 247, the anode 247 being fixedly secured in the plug member 244. As in the case of the anode 223, the anode 247 is provided with a fine thread or helically wound wire 224. The front plug member 244 has integrally formed concentric annular walls 209 and 210 and is made of electrically insulative radiation transparent material. If desired, a further sheet 249 of electrically insulative material may extend in front of the electrically conductive sheet 242 in order to avoid any electrical connection between the collimator 142 and the electrically conductive sheet 242. The further insulative sheet 249 is shown provided with integrally formed projections 250 which are received in the cup-shaped indentations 241 and hold the insulative sheet 249 against lateral movement with respect to the conductive sheet 242.

The electrically insulative sheets 239 and 249 are formed of suitable dielectric material which usually are radiation transparent. The electrically conductive sheet 242 is preferably formed of copper or aluminum or a combination of metals depending upon the amount of radiation transparency which is desired.

An externally threaded rear plug member 251 is threaded into the rear end of hexagonal member 236 and into interiorly threaded aperture 253 in an electrically conductive rear plate member 254. The plug member 251 is provided with integrally formed concentric annular walls 209 and 210, as described above. The plug member 251 is formed of transparent or at least transclucent material to permit the passage of light generated in the ionization chamber 235 to the photographic film 60. The rear end of the plug member 251 is shown flush with the rear surface of the rear plate 254 over which the film 60 extends, however, it may be recessed or protrude out of the plate.

The positive terminal of electrical source 234 is connected through switch 154 and current limiting resistor 155 to the front electrically conductive sheet 242. The cup-shaped indentation 241 is in electrical contact with the head 246 of the anode 247. The anode 247 is thus energized by the positive terminal of source 234. The negative terminal of source 234 is connected directly to the rear plate 254 which, in turn, is in electrical contact with the hexagonal member 236. The lateral wall of member 236 is thereby energized from the negative terminal of source 234.

In operation, collimated radiations entering each radiation chamber 235 cause ionization of the gas therein, as previously described. The ionization is accompanied by an electrical discharge and the generator of light. The light passes through the transparent rear plug member 251 and exposes the photographic film 60. The exposure pattern for the group of hexagonal members 236 will be in accordance with the intensity pattern for the collimated radiations passing through the collimator 142.

Figure 27:
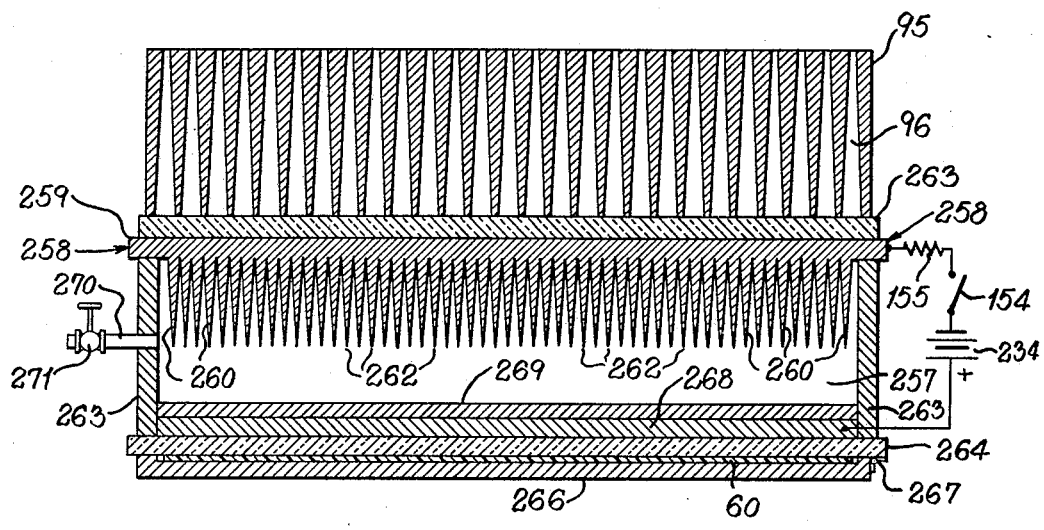
FIGURE 27 is a sectional view in elevation showing a collimator structure associated with an ionization and light producing chamber containing an array of sharp-pointed electrical discharge elements.

FIGURE 27 illustrates an arrangement comprising a unitary ionization chamber 257 filled with a mixture of noble gases such as argon and neon and a quenching agent such as iodine 127 at a pressure of about 100 millimeters mercury. The chamber 257 is ordinarily of rectangular transverse cross-sectional configuration although any other suitable transverse cross-sectional shape may be utilized, where appropriate or desirable.

The unitary chamber 257 is defined, in part, by a front wall designated generally as 258. The front wall 258 comprises a smooth forwardly facing surface 259 and an array of rearwardly directed integrally formed projections 260. Each of the projections 260 is rearwardly convergent and terminates in a very sharp point 262 having a minimum possible radius of curvature consistent with customary methods of production.

A collimator 95 having rearwardly divergent frustoconical collimating apertures 96 is positioned in front of the chamber 257. An electrically insulative radiation transparent sheet or panel member 263 is interposed between the collimator 95 and the smooth front surface 259 of the front wall 258. The chamber 257 is laterally defined by side wall members 263 formed of electrically insulative light opaque material. The rear wall 264 is made of glass. The photographic film 60 is in contact with the rear surface of the glass wall 264 and is protected from stray light by an opaque cover 266 which is hinged to the rear wall 264 at 267. The front surface of the glass wall 264 is covered by a transparent or at least translucent electrically conductive coating or layer 268. The front surface of the conductive layer 268 may optionally be covered by a fluorescent coating or layer 269.

A pipe 270 provided with a shut-off valve 271 is provided for evacuating the chamber 257 and filling it with the desired mixture of noble gases at the desired pressure.

The electrically conductive front wall 258 is connected to the negative terminal of source 234 through a switch 154 and current limiting resistor 155. This causes all of the sharp points 262 to operate as electron emitting cathode members, the electrically conductive layer being connected directly to the positive terminal of source 234.

When the radiation intensity in the immediate vicinity of any sharp point 262 is sufficiently high, electron emission occurs individually from the particular sharp point. No emission occurs from any point where the radiation intensity is less than a predetermined threshold level. The emission is accompanied by light which may be used directly for exposure of the photographic film 60 or, if the fluorescent layer 269 is provided, for excitation of the fluorescent material. The sharp point 262 are so positioned in relation to the glass wall 264 that light emitted from any one point will be localized and will not cause appreciable interfering exposure of the film 60 in the area immediately surrounding the desired area of exposure.

While I have shown and described what I believe to be the best embodiments of my invention, it will be apparent to those skilled in the art that various changes and modifications may be made therein without departing from the spirit and scope of the invention as defined in the appended claims.

What is claimed is:

1. A radiation responsive device of the class described, comprising: a front member formed of light opaque radiation permeable material, said front member facing a source of radiations when said device is in operation; means defining a plurality of individual radiation cells all located in non-communicative fashion behind said front member; light producing means in each cell, said light producing means producing illumination in response to radiation penetrating said front member and passing through the individual cells and producing a total corona discharge triggered by the interaction of radiation in each individual cell which results in the maximum amplification of any radiation event; and a photographic recording medium positioned for exposure by light emitted by said light producing means.

2. A device according to claim 1, further comprising collimating means in front of said front member.

3. A device according to claim 1, further comprising light permeable means interposed between said light producing means and said recording medium.

4. A device according to claim 1, wherein said light producing means comprises a luminescent member which emits light in response to penetration of radiation therein.

5. A device according to claim 1, wherein said light producing means comprises a filament of semi-conductive material arranged in each cell parallel to the path of the incident radiation, the electrical conductivity of which filament increases in response to penetration thereof by radiation, and light-emitting means responsive to current flow through said filaments, said light-emitting means being positioned for exposure of said recording medium; said device further comprising a high voltage energizing circuit for said light producing means.

6. A device according to claim 5, wherein said light-emitting means comprises a condensor-type cap of electroluminescent material carried by each filament and excited by current flowing therethrough.

7. A device according to claim 5, wherein said light-emitting means comprises a cathode glow lamp connected to the filaments for energization by current flowing through said filaments.

8. A device according to claim 1, wherein said light producing means comprises a noble gas confined within an ionization chamber; and light-emitting means responsive to ionization of said gas, said light-emitting means being positioned for exposure of said recording medium; said device further comprising a high voltage energizing circuit for said light producing means.

9. A radiation responsive device of the class described, comprising
radiation collimating means for confining radiations passing therethrough to radiations travelling in substantially parallel paths; radiation responsive light-emitting means disposed in said parallel paths; and photographic recording means positioned for exposure by said light-emitting means, said collimating means comprises two groups of mutually perpendicular effectively radiation opaque strips, the strips within each group being spaced transversely of said paths, said paths being defined by aligned spaces between adjacent strips of both groups.

10. A radiation responsive device of the glass described, comprising: radiation collimating means for confining radiations passing therethrough to radiations travelling in substantially parallel paths; radiation responsive light-emitting means disposed in said parallel paths; and photographic recording means positioned for exposure by said light-emitting means, wherein said collimating means has a plurality of apertures formed therein, each aperture defining one of said parallel paths; and in which said light-emitting means comprises a plurality of separate light emitting elements each disposed in alignment with one of said apertures for response to radiations travelling in a single one of said paths, wherein each light-emitting element comprises a portion which emits light in response to the flow of an electrical current therethrough and a portion the electrical conductivity of which increases in response to radiations penetrating therein, said device further comprising an electrical energizing circuit for said two portions;

said device further comprising a light-opaque radiation permeable electrically conductive member extending across said parallel paths, said conductive member being connected to said energizing circuit and to said light-emitting elements.

11. A device according to claim 10, in which said portion of which the electrical conductivity increases comprises a semi-conductor.

12. A device according to claim 11, in which said portion which emits light comprises an electrofluorescent phosphor, and wherein said energizing circuit includes a source of alternating current.

13. A device according to claim 11, in which said portion which emits light is a cathode glow lamp.

14. A device according to claim 10, wherein said portion of which the electrical conductivity increases comprises ionization chamber means.

15. A device according to claim 14, wherein said portion which emits light comprises an electrofluorescent phosphor, and in which said energizing circuit includes a source of unidirectional current.

16. A device according to claim 14, wherein said portion which emits light comprises a cathode glow lamp.

17. A device according to claim 16, wherein said ionization chamber means and said cathode glow lamp have a common axially extending electrode.

18. A device according to claim 10, in which said light-emitting means comprises grid means defining a plurality of ionization chambers each in alignment with at least one of said paths, each ionization chamber comprising a central electrode, said central electrode having one end connected to said conductive member for energization and support thereby; said device further comprising a sheet of electrically insulative radiation permeable material interposed between said grid means and said conductive member, said grid means being electrically conductive and effectively radiation opaque, said grid means being included in said energizing circuit and forming a common electrode cooperating with all of said central electrodes.

19. A device according to claim 10, wherein said conductive member is interposed between said collimating means and said light-emitting means, and in which said light-emitting means comprises grid means defining a plurality of ionization chambers each in alignment with at least one of said paths, said device further comprising electrically insulative material interposed between said grid means and said conductive member, said electrically insulative material being apertured to permit said conductive member to operate as one common electrode for all of said ionization chambers, said grid means being connected to said energizing circuit for operation as the other common electrode for all of said chambers.

20. A radiation responsive device of the class described, comprising: radiation collimating means for confining radiations passing therethrough to radiations travelling in substantially parallel paths; radiation responsive light-emitting means disposed in said parallel paths; and photographic recording means positioned for exposure by said light-emitting means, said collimating means comprising at least one apertured member formed of effectively radiation opaque material and at least two groups of mutually perpendicular effectively radiation opaque strips, the strips within each group being spaced transversely of said paths, said paths being defined jointly by the apertures in said apertured member and by aligned spaces between adjacent strips of both groups.

21. A device according to claim 20, comprising two apertured members having aligned circular apertures formed therein, the diameters of said apertures being greater than said spacing between adjacent strips.

22. A device according to claim 21, wherein said apertures are of frusto-conical configuration convergent away from said light-emitting means, the apertures in each apertured member being axially aligned and converging toward a common apex with equal angles of convergence.

23. A radiation responsive device of the class decribed, comprising: a series of similar hollow tubular elements positioned in individual side by side relation, said tubular elements being elongated and formed of electrically conductive and radiation impervious material, each of said tubular elements, when in operation, having one of its ends directed toward a source of radiations; means defining an elongated ionization chamber intermediate the ends of each element; collimating means interposed between said ionization chambers and said source of radiations; translucent means at the other end of each element for permitting the passage of light therethrough; an elongated anode extending along the longitudinal axis of each ionization chamber; an ionizable gas confined within each chamber; and electrical energizing circuit connected to energize said anodes and said elements and being of a high voltage sufficient to produce a total corona discharge triggered by the interaction of radiation in each individual element which results in the maximum amplification of any radiation event; and photographic recording means positioned for exposure by light passing through said translucent means.

24. A device according to claim 23, wherein said ionization chamber has a series of ridges formed on the lateral wall thereof.

25. A device according to claim 23, further comprising a helical wire in each element extending coaxially along and surrounding at least a portion of said anode thereof.

26. A device according to claim 23, wherein said collimating means comprises a portion of each element intermediate said one end thereof and said ionization chamber.

27. A device according to claim 23, wherein said collimating means is separate from said elements and is interposed between said one ends thereof and said source of radiations.

28. A device according to claim 23, further comprising electrically insulative means positioned intermediate the ends of each element, said anode being supported by said insulative means and extending therethrough, said insulative means being spaced from said translucent means and included in said chamber defining means, said insulative means being located at the end of said chamber which is remote from said one end of said element, said device comprising a further ionizable gas confined between said insulative means and said translucent means, said anode extending into said further gas for operation as the cathode of a cathode glow lamp.

29. A radiation responsive device of the class described, comprising: an electrically conductive radiation permeable and light-opaque front wall member, said front wall member having a front surface which, when said device is in operation, is directed toward a source of radiations; collimating means in front of said front wall member; a series of sharp pointed rearwardly convergently extending projections formed on the rear side of said front wall member; a translucent rear wall member spaced from said front wall member; an electrically conductive translucent member positioned between said projections and said rear wall member; side wall means defining, with said front and rear wall members, an ionization chamber therebetween; a photographic recording medium extending over the rear side of said rear wall member; and an energizing circuit connected to said front wall member and to said translucent electrically conductive member.

References Cited

UNITED STATES PATENTS

| | | | |
|---|---|---|---|
| 2,779,876 | 1/1957 | Tobias et al. | 250—83.3 |
| 2,837,661 | 6/1958 | Orthuber et al. | 250—71.5 X |
| 3,048,698 | 8/1962 | Carlson | 250—105 X |
| 3,320,418 | 5/1967 | Steel | 250—71.5 |

OTHER REFERENCES

Advances in Medical Scanning, by Sodee, from Nucleonics, vol. 22, No. 9, September 1964.

ARCHIE R. BORCHELT, Primary Examiner

U.S. Cl. X.R.

250—71.5, 83.3, 105